United States Patent
Baessler et al.

(10) Patent No.: US 9,898,516 B2
(45) Date of Patent: *Feb. 20, 2018

(54) VERIFICATION OF TRANSFORMED CONTENT

(71) Applicant: International Business Machines Corporation, Armonk, NY (US)

(72) Inventors: Michael Baessler, Neckartenzlingen (DE); Thomas A. P. Hampp-Bahnmueller, Stuttgart-Vaihingen (DE); Philipp Hoffmann, Weil im Schonbuch (DE); Markus Lorch, Dettenhausen (DE); Juergen Maletz, Wildberg (DE); Daniel Pittner, Steinenbronn (DE); Werner Schollenberger, Holzgerlingen (DE); Dirk Seider, Grosselfingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/281,364

(22) Filed: Sep. 30, 2016

(65) Prior Publication Data

US 2017/0017704 A1 Jan. 19, 2017

Related U.S. Application Data

(63) Continuation of application No. 14/296,938, filed on Jun. 5, 2014, now Pat. No. 9,529,876, which is a
(Continued)

(51) Int. Cl.
*G06F 17/30* (2006.01)

(52) U.S. Cl.
CPC .. *G06F 17/30563* (2013.01); *G06F 17/30011* (2013.01); *G06F 17/30371* (2013.01)

(58) Field of Classification Search
CPC ......... G06F 17/30563; G06F 17/30011; G06F 17/30371
(Continued)

(56) References Cited

U.S. PATENT DOCUMENTS

| 7,035,468 B2 | 4/2006 | Yogeshwar et al. |
| 7,251,777 B1 | 7/2007 | Valtchev et al. |

(Continued)

FOREIGN PATENT DOCUMENTS

| WO | 0195088 A1 | 12/2001 |
| WO | 2009103496 A1 | 8/2009 |
| WO | 2013067233 A1 | 5/2013 |

OTHER PUBLICATIONS

Baessler, et al. Original U.S. Appl. No. 14/135,262, filed Dec. 19, 2013.
(Continued)

*Primary Examiner* — Jensen Hu
(74) *Attorney, Agent, or Firm* — Tihon Poltavets

(57) ABSTRACT

A computer manages methods for determining accurate document transformation by rendering the source document into a non-rasterized format, where the non-rasterized format is a rendered source document. The computer rendering the target document into a non-rasterized format, where the non-rasterized format is a rendered target document. The computer comparing one or more aspects of the rendered source document to corresponding one or more aspects of the rendered target document. The computer determining, based, at least in part, on the compared one or more aspects, whether or not the source document was accurately transformed to the target document.

20 Claims, 4 Drawing Sheets

Related U.S. Application Data continuation of application No. 14/135,262, filed on Dec. 19, 2013, now Pat. No. 9,529,874.

(58) Field of Classification Search
USPC .......................................................... 707/687
See application file for complete search history.

(56) References Cited

U.S. PATENT DOCUMENTS

| | | |
|---|---|---|
| 7,623,710 B2 | 11/2009 | Simard et al. |
| 7,725,728 B2 | 5/2010 | Ama |
| 7,742,953 B2 | 6/2010 | King et al. |
| 8,676,731 B1 | 3/2014 | Sathyanarayana et al. |
| 8,897,538 B1 | 11/2014 | Smith |
| 8,897,563 B1 | 11/2014 | Welling et al. |
| 2004/0181746 A1 | 9/2004 | McLure et al. |
| 2008/0301544 A1 | 12/2008 | Davidson et al. |
| 2010/0185637 A1 | 7/2010 | Morris et al. |
| 2011/0197121 A1 | 8/2011 | Kletter |
| 2013/0174011 A1 | 7/2013 | Le Chevalier et al. |
| 2015/0178358 A1 | 6/2015 | Baessler et al. |

OTHER PUBLICATIONS

Baessler, et al. Original U.S. Appl. No. 14/296,938, filed Jun. 5, 2014.

Appendix P List of Patent Applications or Patents Treated as Related. Dated Sep. 29, 2016. Two pages.

VERIFICATION OF TRANSFORMED CONTENT

FIELD OF THE INVENTION

The present invention relates generally to content transformation, and more particularly, to validating accurate content transformation.

BACKGROUND OF THE INVENTION

Extract Transform Load (ETL) refers to a process in database usage, more specifically in data warehousing, performed by an ETL tool. The process includes extracting an original document from a source, transforming the data to fit operational needs, and loading the transformed document into an end target (e.g., database or database warehouse). The process typically consists of numerous processes which the ETL tool sequences together. Original documents (i.e., source documents) are typically deleted from a storage location after being transformed into another document format (i.e., target document). Typically, source documents relate to source applications, such as, email programs from where the source documents are extracted during the ETL process.

SUMMARY

Embodiments of the present invention disclose a method, computer program product and computer system for determining accurate document transformation.

A computer-implemented method queuing, by one or more processors, a source document for transformation to a target document according to an assigned priority for the target document, wherein the assigned priority is based on a descending order of file sizes for target documents of queued source documents; responsive to determining the source document is next in the queue, transforming, by one or more processors, content of the source document into the target document, wherein transforming the content of the source document includes transforming the content from the first format to the second format; responsive to determining an increased likelihood the source document was not accurately transformed to the target document based on a file size for the target document, rendering, by one or more processors, the source document into a non-rasterized graphical format, wherein a rendered source document represents the source document in the non-rasterized graphical format; and determining, by one or more processors, based at least in part on a comparison of one or more aspects of the rendered source document and a rendered target document in a non-rasterized graphical format, the source document was accurately transformed to the target document.

DETAILED DESCRIPTION

Figure 1:
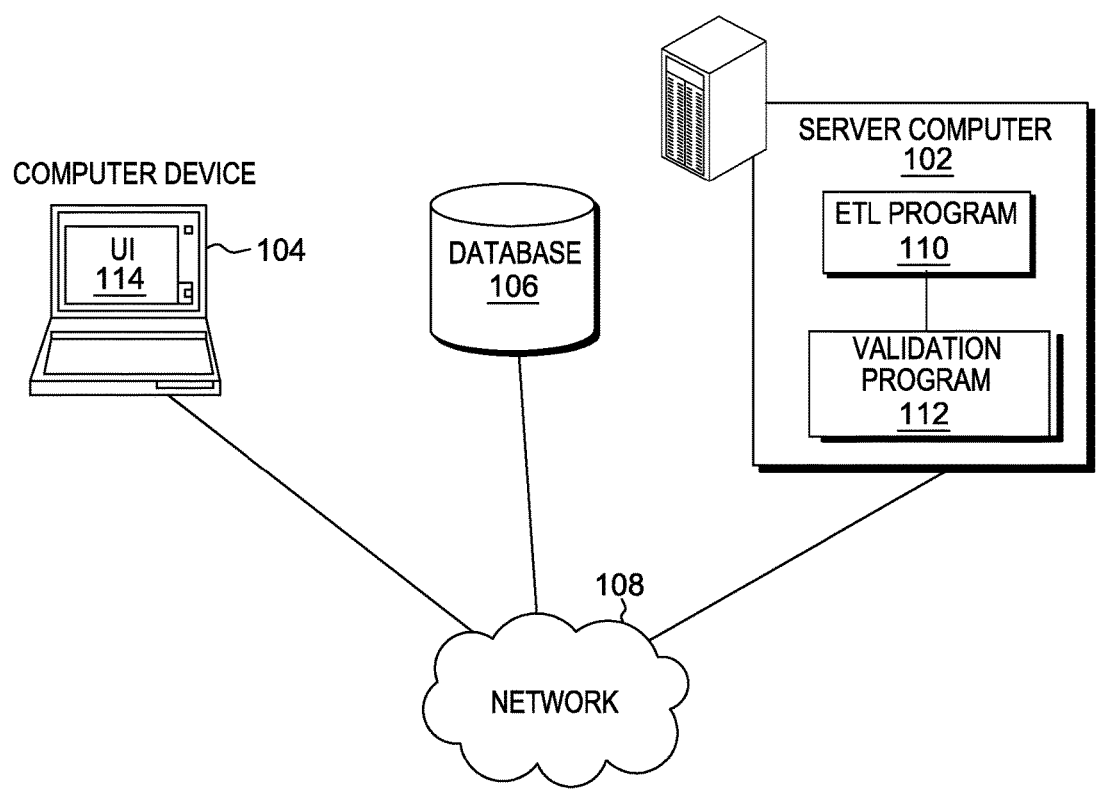
FIG. 1 is a functional block diagram illustrating a distributed data processing environment, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, aspects of the present invention may take the form of a computer program product embodied in one or more computer-readable media having computer readable program code/instructions embodied thereon.

Any combination of computer-readable media may be utilized. Computer-readable media may be a computer-readable signal medium or a computer-readable storage medium. A computer-readable storage medium may be, for example, but is not limited to, an electronic, magnetic, optical, electromagnetic, or semiconductor system, apparatus, or device, or any suitable combination of the foregoing. More specific examples (a non-exhaustive list) of a computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Some embodiments of the present invention recognize that there may be situations where a transformation of a source document to a target document is not accurate. For example, certain objects (e.g., textual content) may not transfer from the source document to the target document. Such situations may not be immediately apparent during the transformation and the original document may be deleted resulting in lost content which may not have transferred. Instances, such as, archiving a large quantity of documents, the content of the source documents has to transform to the target document to ensure all of the information is accurately archived in the end target.

FIG. 1 is a functional block diagram illustrating a distributed data processing environment, in accordance with one embodiment of the present invention. Distributed data processing environment includes server computer 102, computer device 104, and database 106 interconnected over network 108.

Server computer 102 may be a desktop computer, a laptop computer, a tablet computer, a specialized computer server, a smartphone, or any other computer system known in the art. In certain embodiments, server computer 102 represents a computer system utilizing clustered computers and components that act as a single pool of seamless resources when accessed through network 108, as is common in data centers and with cloud computing applications. In general, server computer 102 is representative of any programmable electronic device or combination of programmable electronic devices capable of executing machine-readable program instructions and communicating with other computer devices via a network. In this embodiment, server computer 102 has the ability to communicate with other computer devices to query the computer devices for information.

Extract Transform and Load (ETL) program 110 residing in server computer 102 has the ability to receive source documents sent from computer device 104. ETL program 110 can also receive source documents from multiple computer devices not illustrated in FIG. 1. ETL program 110 can transform the source documents and load the transformed documents (i.e., target documents) into a target storage location, such as, database 106. Such a transformation, also referred to as an ETL process, transforms the content of a source document (e.g., HTML to plain text) and stores the transformed content in the form of a target document. ETL program 110 can be a server-based program. ETL program 110 may comprise programs or tools such as validation program 112 and an index containing the target documents archived in the target storage location. In this embodiment, ETL program 110 communicates with validation program 112 residing in server computer 102.

Validation program 112, residing in computer server 102, has the ability to compare source documents to target documents and determine if the transformation during the ETL process was accurate. In one embodiment, validation program 112 is capable of creating a non-rasterized version, such as a PDF document, of both the source document and the target document. In another embodiment, validation program 112 is capable of querying a program, not illustrated in FIG. 1, for the non-rasterized versions of the source document and the target document. Validation program 112 compares the non-rasterized source document to the non-rasterized target document to determine whether or not the transformation was accurate. In this embodiment, upon determining the transformation was accurate, validation program 112 deletes the source document.

In general, network 108 can be any combination of connections and protocols that will support communications between server computer 102, computer device 104 and database 106. Network 108 can include, for example, a local area network (LAN), a wide area network (WAN) such as the internet, a cellular network, or any combination of the preceding, and can further include wired, wireless, and/or fiber optic connections.

In one embodiment, validation program 112 is a web service accessible via network 108 to a user of a separate device, e.g., computer device 104. In another embodiment, validation program 112 is operated directly by a user of server computer 102.

User interface 114, on computer device 104, displays the information that any one of the processes of validation program 112 may display to a user. User interface 114 can be, for example, a graphical user interface (GUI) or a web user interface (WUI) and can display text, documents, web browser windows, user options, application interfaces and instructions for operation.

In various embodiments of the present invention, computer device 104 can be a laptop computer, a tablet computer, a netbook computer, a personal computer (PC), a desktop computer, a personal digital assistant (PDA), a smartphone, or any programmable electronic device capable of communicating with server computer 102 and database 106 via network 108. In this embodiment, computer device 104 stores the source documents which ETL program 110 transforms and has the ability of providing an application programming interface (API) for extracting content in the source documents during the ETL process.

Database 106 can store content of ETL program 110 and validation program 112 such as, non-rasterized versions of the source and target documents. Database 106 can have a index accessible by a user of computer device 104, ETL program 110, and validation program 112 on server computer 102. Database 106 can also be located on server computer 102, computer device 104, or any other location in the distributed data processing environment connected to network 108.

For discussion purposes, in this embodiment, validation program 112 compares a source document transformed to a target document during an ETL process and determines how accurately the content of the source document is represented in the target document. In another embodiment, validation program 112 compares a source document to an index of the source document to determine if the content contained within the source document is accurately represented. Such an embodiment is applicable in an environment where document archiving is performed in a database and where key aspects of the target document are validated with respect to the source document.

Figure 2:
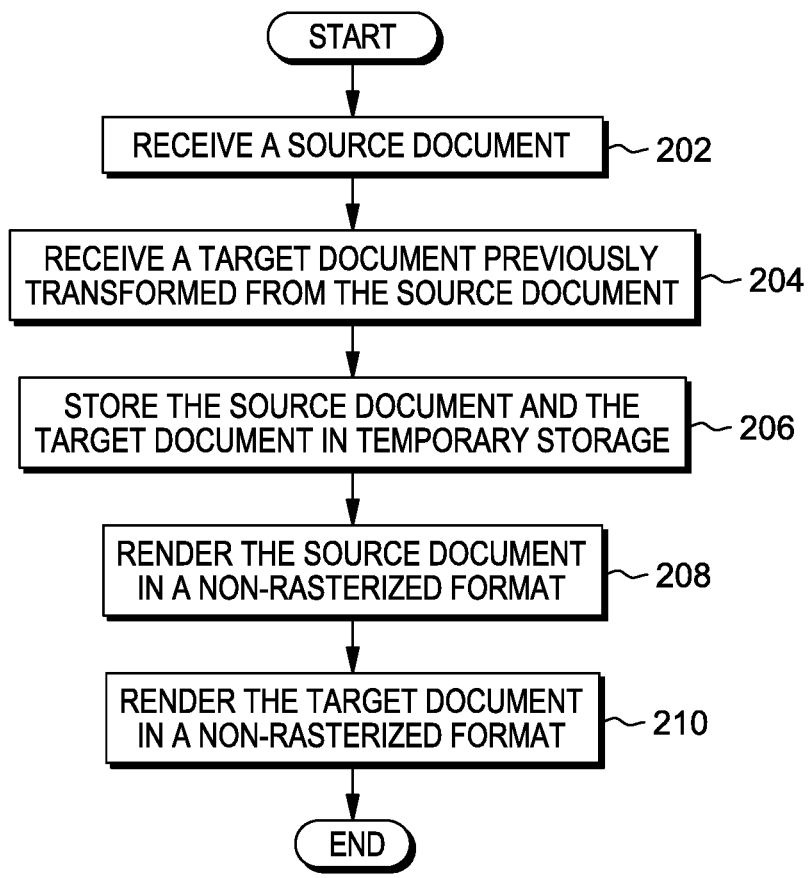
FIG. 2 is a flowchart depicting operational steps of an ETL program transforming a source document to a target document, in accordance with an embodiment of the present invention.

FIG. 2 is a flowchart depicting operational steps of an ETL program transforming a source document to a target document, in accordance with an embodiment of the present invention.

Validation program 112 receives a source document (step 202). In this embodiment, validation program 112 receives the source document from computer device 104 over network 108. Alternatively, validation program 112 receives the source document from any client device or computer subsystem via network 108. The source document can be an email, a Word document, an Excel spreadsheet, or any other type of document which can be transformed during an ETL process. In this embodiment, computer device 104 sends the source document to ETL program 110 and validation program 112 over the network. ETL program 110 transforms the source document to a target document, so that it can be stored (i.e., archived) in a target storage location. The transformation ETL program 110 performs is also known as an ETL process. ETL program 110 can decompose the source document, for example, separating attachments of the source documents so ETL program 110 can accurately perform the transformation during the ETL process. ETL program 110 transforms content of the source document to another format and designates the document having the other format as the target document. For example, an email source document in HTML format may be transformed into a target document in plain text format. Prior to ETL program 110 sending the target document to the target storage location, ETL program 110 sends the target document to validation program 112 to ensure the accuracy of the document transformation.

Validation program 112 receives the target document previously transformed from the source document (step 204). In this embodiment, validation program 112 receives the target document from ETL program 110 upon completing the ETL process with the transformation of the source document to the target document. In another embodiment, validation program 112 has a queue function, where validation program 112 queues the target document(s) prior to receiving them. This queue function allows for validation program 112 to queue the target documents during instances where there are a large quantity of documents are being processed. Accordingly, validation program 112 queues the target documents and assigns priority to particular target documents which are to be received first. For example, if there is a particular target document in the queue that another program is calling for, validation program 112 can move the particular target document to the front of the queue. Further, validation program 112 can receive the particular target document first regardless of when the target document was sent by ETL program 110. In another example, validation program 112 assigns priority to target documents of a large size compared to target documents of a smaller size. Assigning priority recognizes the increased likelihood of ETL program 110 not accurately transforming the source document of the larger size during the ETL process. Smaller sized target documents have less content for ETL program 110 to transform, so there is a lesser likelihood that ETL program 110 did not accurately transform the source document during the ETL process.

Validation program 112 stores the source document and the target document in temporary storage (step 206). In this embodiment, validation program 112 stores the source document and the target document in a temporary storage location allocated in database 106. In that way, temporary storage location of database 106 can act as a buffer for validation program 112 to gain quick access to the source document and target document during the validation process. The source document and the target document are stored in the temporary storage location to ensure the source document is not deleted prior to validation program 112 determining that the target document is an accurate transformation of the source document.

Validation program 112 renders the source document in a non-rasterized format (step 208). In this embodiment, validation program 112 accesses the source document in temporary storage to render the source document in the non-rasterized format. The non-rasterized format, such as a PDF, is where a dot matrix data structure is not present when representing a document. The dot matrix data structure is generally a rectangular grid of pixels which produce an image. Such an image can be, for example, a letter in a word, where the letter "d" is a pixilated image in the word "dog". The non-rasterized format, such as that of PDF files, do not use image-based graphics to render a document. It is that type of image that validation program 112 renders. In one example, the source document is an email in HTML format and validation program 112 renders the email in a PDF format. In some embodiments, validation program 112 renders the PDF of the email in HTML format along with any attachments of the source document. In this embodiment, validation program 112 stores the rendered PDF of the email, in the same temporary storage location where validation program 112 stores the source document.

Validation program 112 renders the target document in a non-rasterized format (step 210). Similar to how validation program 112 renders the source document in the non-rasterized format, validation program 112 renders the target document in the non-rasterized format. In this embodiment, validation program 112 accesses the target document in temporary storage to render the target document in the non-rasterized format. In this embodiment, the non-rasterized format of the source document is the same as the non-rasterized format of the target document to ensure validation program 112 can perform an accurate determination for accuracy. Alternatively, the non-rasterized formats of the two rendered documents are different. In one example, the target document is an email in plain text format and validation program 112 renders the email in a PDF format. In another example, validation program 112 renders a PDF of the email in plain text format as well as any attachments of the email. In this example, validation program 112 stores the rendered PDF of the email and any corresponding attachments, in the same temporary storage location where validation program 112 stores the target document.

Figure 3:
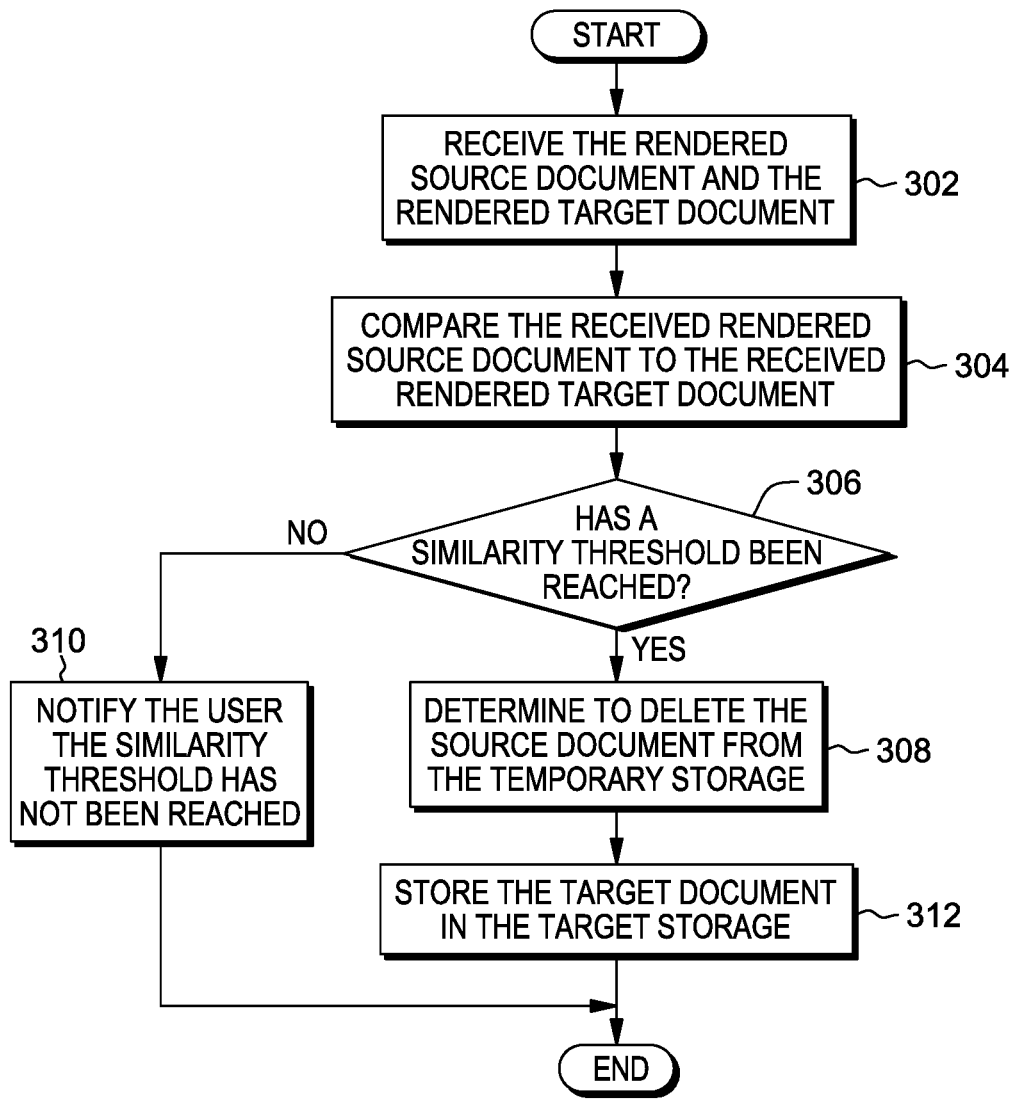
FIG. 3 is a flowchart depicting operational steps of a validation program for comparing a source document with a target document, in accordance with an embodiment of the present invention.

FIG. 3 is a flowchart depicting operational steps of a validation program for comparing a source document with a target document, in accordance with an embodiment of the present invention.

Validation program 112 receives the rendered source document and the rendered target document (step 302). In one embodiment, validation program 112 queries a temporary storage location allocated in database 106 to obtain the rendered source and target documents. It should be noted that validation program 112 can query database 106 for any available rendered source and target documents which have yet to be compared for transformation accuracy. In another embodiment, validation program 112 has a queue with the rendered source documents and the rendered target documents. In this embodiment, upon validation program 112 storing the rendered source and target documents in the temporary storage location allocated in database 106, validation program 112 queues the rendered source and target documents for comparison to determine if the transformation was accurate. In one example, a queue is based on the duration that the rendered source and target documents have been stored in the temporary storage location. The longer the duration, the higher up the rendered source and target documents are moved in the queue for validation program 112 to receive and compare for transformation accuracy. In another example, a queue is based on a file size of the rendered source document. The smaller the file size of the rendered source document, the lower the position the rendered source and target documents have in the queue for validation program 112 to compare.

Validation program 112 compares the received rendered source document to the received rendered target document (step 304). In this embodiment, validation program 112 compares the received rendered source document to the received rendered target document utilizing known comparison algorithms. Such comparison algorithms examine various aspects of the rendered source document and determine to what extent the various aspects are present in the rendered target document. An aspect of a document may be tokens (e.g., text) present in the rendered source document. For example, validation program 112 compares the tokens present in the rendered source document to the tokens present in the target document. Validation program 112 determines which tokens in the rendered source document appear in the rendered target document. Further, validation program 112 can determine if the tokens appear with the same frequency.

Another aspect of a document may be the layout. For example, validation program 112 removes the text from both, the rendered source and target document to determine the how accurately the layout of the rendered source document compares to the rendered target document. In this example, validation program 112 uses an image histogram of the layout for the rendered source document and an image histogram of the layout for the rendered target document to determine the accuracy of the transformation. Image histograms represent the tonal distribution in a digital image, which in this example is the layout of both the rendered source and target documents. The more similar the image histograms (i.e., the more overlapping), the more accurate the transformation of the layout between the rendered source document and the rendered target document.

Another aspect of a document may be the overall visual appearance. For example, validation program 112 compares the overall visual appearance of the rendered source document to that of the rendered target document. Such a comparison can be ideal for a source document of a smaller storage size because there is less content that ETL program 110 transfers to the target document. In one embodiment, validation program 112 utilizes a similar method of comparing the layouts of the documents, where validation program 112 utilizes image histogram comparison for entire rendered source document. Validation program 112 compares the overall image histogram of the rendered source document to the rendered target document to determine the accuracy of the transformation.

In another embodiment, validation program 112 identifies embedded objects such as, tables or images in the rendered source document and determines if the identified embedded objects exist in the rendered target document. Validation program 112 can also determine how accurately the embedded objects in the rendered source document compare to the rendered target document. For example, validation program 112 compares the dimensions of the embedded objects (e.g., tables and images) in the rendered source document to identify if the embedded objects are accurately presented in the rendered source document.

Validation program 112 determines if a similarity threshold has been reached (decision step 306). The similarity threshold serves as a validation of the accuracy of the document transformation. In this embodiment, validation program 112 receives a user input specifying the similarity threshold. In one embodiment, the similarity threshold is 98% transformation accuracy, where 98% of the overall target document is contained in the source document. In another embodiment, validation program 112 has multiple similarity thresholds, where there is one similarity threshold for the token (e.g., text) accuracy and another similarity threshold for the layout accuracy. For example, validation program 112 has a token accuracy threshold of 99% with a layout threshold of 90%. Multiple similarity thresholds provide for designating what content of the source document is more important when compared to the target document.

If validation program 112 determines the similarity threshold has been reached ("yes" branch, step 306), validation program 112 proceeds to step 308. If validation program 112 determines the similarity threshold has not been reached ("no" branch, step 306), validation program 112 proceeds to step 310 where validation program 112 notifies the user that the transformation of the source document to the target document is not accurate. Alternatively, validation program 112 prompts notification of the user that the transformation of the source document to the target document is not accurate.

Validation program 112 determines to delete the source document from the temporary storage (step 308). In this embodiment, upon determining the similarity threshold level was met and the transformation of content from the source document to the target document was accurate, validation program 112 deletes the source document from the temporary storage. In one embodiment, validation program 112 notifies database 106 to delete the source document along with the rendered source document from the temporary storage. In another embodiment, if validation program 112 is located on the same server computer 102, as database 106, validation program 112 triggers the deletion of the source document and the rendered source document.

Validation program 112 notifies the user that the similarity threshold has not been reached (step 310). In this embodiment, validation program 112 prompts a window on user interface 112 of computer device 104 to notify the user the similarity threshold has not been reached for the transformation of the source document to the target document during the ETL process ETL program 110 performs. In another embodiment, validation program 112 prompts the source document and the target document which have not met the similarity threshold in decision step 306. In some embodiments, the user can have the ability to override the similarity threshold via a user input specifying the source document and target document are similar. Alternatively, validation program 112 can have the ability to receive a user input requesting ETL program 110 to perform the ETL process for the source document again in order to transform the source document into a new target document.

Validation program 112 stores the target document in the target storage (step 312). In this embodiment, validation program 112 stores the target document in database 106 (i.e., target storage). Accordingly, validation program 112 can transfer the target document from the temporary storage location allocated in database 106 to the target storage (i.e., archive) located within database 106. In this embodiment, upon storing the target document, validation program 112 deletes the target document and the rendered target document from the temporary storage location. In another embodiment, validation program 112 requests a separate archiving engine in database 106 store the target document in the target storage location.

Figure 4:
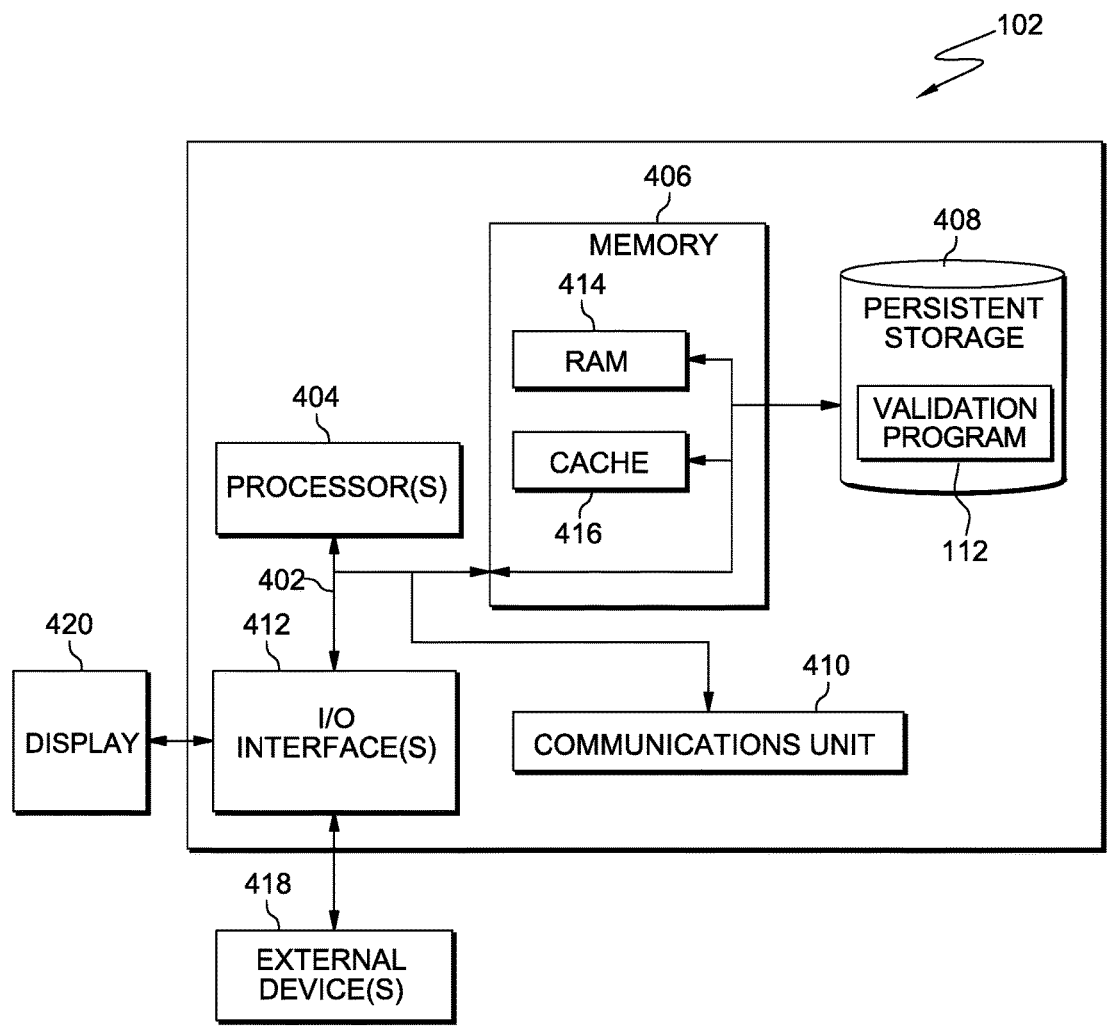
FIG. 4 is a block diagram of components of a computer system, such as the computer server of FIG. 1, in accordance with an embodiment of the present invention.

FIG. 4 depicts a block diagram of components of a computer, such as server computer 102, operating validation program 112 within distributed data processing environment, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server computer 102 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are examples of computer-readable tangible storage devices. A storage device is any piece of hardware that is capable of storing information, such as, data, program code in functional form, and/or other suitable information on a temporary basis and/or permanent basis. In this embodiment, memory 406 includes random access memory (RAM) 414 and cache memory 416. In general, memory 406 can include any suitable volatile or non-volatile computer-readable storage device.

Validation program 112 is stored persistent storage 408 for execution by one or more of computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage medium that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including systems and devices within or controlled by server computer 102. In these examples, communications unit 410 includes one or more wireless network interface cards. Communications unit 410 may provide communications through the use of either or both physical and wireless communications links. Computer programs and processes, such as validation program 112, may be downloaded to persistent storage 408 through communications unit 410, or uploaded to another system through communications unit 410.

I/O interface(s) 412 allows for input and output of data with other devices that may be connected to server computer 102. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 408 via I/O interface(s) 412. I/O interface(s) 412 may also connect to a display 420.

Display 420 provides a mechanism to display data to a user and may be, for example, a touch screen or a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for determining accurate document transformation, the method comprising:
   queuing, by one or more processors, a source document for transformation to a target document according to an assigned priority for the target document, wherein the assigned priority is based on a descending order of file sizes for target documents of queued source documents;

responsive to determining the source document is next in the queue, transforming, by one or more processors, content of the source document into the target document, wherein transforming the content of the source document includes transforming the content from the first format to the second format;

responsive to determining an increased likelihood the source document was not accurately transformed to the target document based on a file size for the target document, rendering, by one or more processors, the source document into a non-rasterized graphical format, wherein a rendered source document represents the source document in the non-rasterized graphical format; and determining, by one or more processors, based at least in part on a comparison of one or more aspects of the rendered source document and a rendered target document in a non-rasterized graphical format, the source document was accurately transformed to the target document.

2. The method of claim 1, further comprising:
receiving, by one or more processors, the source document for transformation to the target document during an Extract Transform Load (ETL) process, wherein the source document is in a first format and the target document is in a second format.

3. The method of claim 2, further comprising:
rendering, by one or more processors, the target document into the non-rasterized graphical format, wherein the rendered target document represents the target document in the non-rasterized graphical format; and
comparing, by one or more processors, one or more aspects of the rendered source document to corresponding one or more aspects of a rendered target document.

4. The method of claim 1, wherein determining the source document was accurately transformed to the target document, comprises:
identifying, by one or more processors, a similarity threshold level, where the similarity threshold level represents whether the source document was accurately transformed to the target document; and
determining, by one or more processors, whether or not the rendered target document has met the similarity threshold level with relation to the rendered source document.

5. The method of claim 4, further comprising:
displaying, by one or more processors, a notification on a user interface, wherein the notification includes a list including the source document, the target document, and the similarity threshold level.

6. The method of claim 1, wherein the one or more aspects include text content of a document, a layout of a document, an embedded object, or an overall visual appearance of a document.

7. The method of claim 1, wherein rendering the source document into a non-rasterized graphical format, comprises:
identifying, by one or more processors, one or more attachments associated with the source document; and
rendering, by one or more processors, each of the one or more attachments associated with the source document into a non-rasterized format.

8. A computer program product for determining accurate document transformation, the computer program product comprising:
one or more computer readable storage media;
program instructions stored on the one or more computer readable storage media, the program instructions comprising:
program instructions to queue a source document for transformation to a target document according to an assigned priority for the target document, wherein the assigned priority is based on a descending order of file sizes for target documents of queued source documents;
program instructions to, responsive to determining the source document is next in the queue, transform content of the source document into the target document, wherein transforming the content of the source document includes transforming the content from the first format to the second format;
program instructions to, responsive to determining an increased likelihood the source document was not accurately transformed to the target document based on a file size for the target document, render the source document into a non-rasterized graphical format, wherein a rendered source document represents the source document in the non-rasterized graphical format; and
program instructions to determine based at least in part on a comparison of one or more aspects of the rendered source document and a rendered target document in a non-rasterized graphical format, the source document was accurately transformed to the target document.

9. The computer program product of claim 8, further comprising program instructions, stored on the one or more computer readable storage media, which when executed by a processor, cause the processor to:
receive the source document for transformation to the target document during an Extract Transform Load (ETL) process, wherein the source document is in a first format and the target document is in a second format.

10. The computer program product of claim 9, further comprising program instructions, stored on the one or more computer readable storage media, which when executed by a processor, cause the processor to:
render the target document into the non-rasterized graphical format, wherein the rendered target document represents the target document in the non-rasterized graphical format; and
compare one or more aspects of the rendered source document to corresponding one or more aspects of a rendered target document.

11. The computer program product of claim 8, wherein the program instructions to determine the source document was accurately transformed to the target document, comprise program instructions, stored on the one or more computer readable storage media, which when executed by a processor, cause the processor to:
identify a similarity threshold level, where the similarity threshold level represents whether the source document was accurately transformed to the target document; and
determine whether or not the rendered target document has met the similarity threshold level with relation to the rendered source document.

12. The computer program product of claim 11, further comprising program instructions, stored on the one or more computer readable storage media, which when executed by a processor, cause the processor to:

display a notification on a user interface, wherein the notification includes a list including the source document, the target document, and the similarity threshold level.

13. The computer program product of claim 8, wherein the one or more aspects include text content of a document, a layout of a document, an embedded object, or an overall visual appearance of a document.

14. The computer program product of claim 8, wherein the program instructions to render the source document into a non-rasterized graphical format comprise program instructions, stored on the one or more computer readable storage media, which when executed by a processor, cause the processor to:
    identify one or more attachments associated with the source document; and
    render each of the one or more attachments associated with the source document into a rasterized format.

15. A computer system for managing methods for determining accurate document transformation, the computer program product comprising, the computer system comprising:
    one or more computer processors;
    one or more computer readable storage media;
    program instructions stored on the one or more computer readable storage media, for execution by at least one of the one or more computer processors, the program instructions comprising:
    program instructions to queue a source document for transformation to a target document according to an assigned priority for the target document, wherein the assigned priority is based on a descending order of file sizes for target documents of queued source documents;
    program instructions to, responsive to determining the source document is next in the queue, transform content of the source document into the target document, wherein transforming the content of the source document includes transforming the content from the first format to the second format;
    program instructions to, responsive to determining an increased likelihood the source document was not accurately transformed to the target document based on a file size for the target document, render the source document into a non-rasterized graphical format, wherein a rendered source document represents the source document in the non-rasterized graphical format; and
    program instructions to determine based at least in part on a comparison of one or more aspects of the rendered source document and a rendered target document in a non-rasterized graphical format, the source document was accurately transformed to the target document.

16. The computer system of claim 15, further comprising program instructions, stored on the one or more computer readable storage media, which when executed by a processor, cause the processor to:
    receive the source document for transformation to the target document during an Extract Transform Load (ETL) process, wherein the source document is in a first format and the target document is in a second format.

17. The computer system of claim 16, further comprising program instructions, stored on the one or more computer readable storage media, which when executed by a processor, cause the processor to:
    render the target document into the non-rasterized graphical format, wherein the rendered target document represents the target document in the non-rasterized graphical format; and
    compare one or more aspects of the rendered source document to corresponding one or more aspects of a rendered target document.

18. The computer system of claim 15, wherein the program instructions to determine the source document was accurately transformed to the target document, comprise program instructions, stored on the one or more computer readable storage media, which when executed by a processor, cause the processor to:
    identify a similarity threshold level, where the similarity threshold level represents whether the source document was accurately transformed to the target document; and
    determine whether or not the rendered target document has met the similarity threshold level with relation to the rendered source document.

19. The computer system of claim 18, further comprising program instructions, stored on the one or more computer readable storage media, which when executed by a processor, cause the processor to:
    display a notification on a user interface, wherein the notification includes a list including the source document, the target document, and the similarity threshold level.

20. The computer system of claim 19, wherein the one or more aspects include text content of a document, a layout of a document, an embedded object, or an overall visual appearance of a document.

\* \* \* \* \*